US005575462A

United States Patent [19]

Blatt

[11] Patent Number: 5,575,462

[45] Date of Patent: Nov. 19, 1996

[54] ROTARY CLAMP FOR A LINEAR ACTUATOR

[76] Inventor: John A. Blatt, 22 Stratton Pl., Grosse Pointe Shores, Mich. 48236

[21] Appl. No.: 291,687

[22] Filed: Aug. 17, 1994

[51] Int. Cl.[6] .......... B23Q 3/08

[52] U.S. Cl. .......... 269/32

[58] Field of Search .......... 254/32, 27, 25, 254/24, 93, 228, 91, 94, 285

[56] References Cited

U.S. PATENT DOCUMENTS

| | | |
|---|---|---|
| 2,845,847 | 8/1958 | Blatt et al. . |
| 3,027,155 | 3/1962 | Paterson . |
| 3,347,542 | 10/1967 | Mericle, Jr. . |
| 3,362,703 | 1/1968 | Blatt . |
| 3,381,954 | 5/1968 | Blatt . |
| 3,545,050 | 12/1970 | Blatt et al. . |
| 3,570,835 | 3/1971 | McPherson . |
| 3,618,931 | 11/1971 | Blatt . |
| 3,702,185 | 11/1972 | Blatt . |
| 3,920,234 | 11/1975 | Blatt . |
| 3,926,418 | 12/1975 | Blatt . |
| 4,021,027 | 5/1977 | Blatt . |
| 4,396,183 | 8/1983 | Lymburner . |
| 4,458,889 | 7/1984 | McPherson et al. . |
| 4,496,138 | 1/1985 | Blatt . |
| 4,570,914 | 2/1986 | Blatt . |
| 4,620,696 | 11/1986 | Blatt . |
| 4,637,597 | 1/1987 | McPherson et al. . |
| 4,728,137 | 3/1988 | Hamed et al. . |
| 4,905,973 | 3/1990 | Blatt . |
| 5,080,336 | 1/1992 | Carossino . |
| 5,118,088 | 6/1992 | Sawdon . |
| 5,165,670 | 11/1992 | Sawdon . |
| 5,171,001 | 12/1992 | Sawdon . |
| 5,190,334 | 3/1993 | Sawdon . |
| 5,215,295 | 6/1993 | Hoover . |

FOREIGN PATENT DOCUMENTS

| | | |
|---|---|---|
| 2340798 | 8/1980 | France . |
| 2555207 | 7/1976 | Germany . |

OTHER PUBLICATIONS

Reexamination Certificate BI 4,905,973 issued Jul. 5, 1994.

*Primary Examiner*—Robert C. Watson

*Attorney, Agent, or Firm*—Young & Basile, P.C.

[57] ABSTRACT

A rotary clamp for a linear actuator having means for converting linear actuator motion between a first position and a second position into rotary clamp motion between an unclamped position and a clamped position wherein a reciprocating member provides means, separate from the linear actuator, for resetting the converting linkage toward the first position without having to disassemble the rotary clamp of the linear actuator. The reciprocating member also provides a secondary stop to prevent the converting linkage from reaching an over-center position. The reciprocating member is slidably disposed and captured within a wall of a housing of the rotary clamp. If power is lost to the rotary clamp, the clamp may become "locked" in the clamped position, and the reciprocal member may be struck from the outside of the housing in order to drive the linear actuator toward the unclamped position thus manually resetting the converting means of the clamp. The reciprocal member abuts the inside wall of the housing in its fully retracted position to provide a secondary stop to the linear actuator and prevent the linkage mechanism from reaching an over-center position. A cam means is provided for guiding and supporting the linear actuator against linkage forces directed perpendicular to the linear line of motion, thus eliminating the need for side walls in the housing.

16 Claims, 3 Drawing Sheets

ROTARY CLAMP FOR A LINEAR ACTUATOR

FIELD OF THE INVENTION

The present invention relates, in general, to rotary clamps for linear actuators, and more particularly, to a linkage that converts linear actuator motion between a first position and a second position into rotary clamp motion between an unclamped position and a clamped positionswherein a reciprocal member provides means for manually resetting the converting linkage toward the first position and stop means for limiting the travel of the linear actuator in the second position.

BACKGROUND OF THE INVENTION

Rotary clamps are known of the type in which linear actuator reciprocating movement is adapted to be translated into angular rotary movement of a clamp arm. The linear actuator may be powered by a fluid motor, and an additional linkage or other transmitting means converts the linear actuator motion to a rotary clamp motion. Normally, when the fluid motor is in a retracted position, the clamp is in a released position, that is, the clamp arm is removed from the work supporting surface, and by means of fluid pressure, the clamp arm is pivotally moved into clamping position to clamp a work piece to a work supporting surface and hold and/or locate the work piece against the work supporting surface.

Various guide and linkage means have been proposed to correctly translate linear reciprocating movement of a piston and piston rod, utilized in the linear actuator, to correctly swing the clamp arm into or out of clamping position, seeking to obtain the highest mechanical advantage which can be utilized within the power stroke of the linear actuator. All of these known mechanisms, more or less, include complex designs of various mechanical components at high manufacturing and assembly cost.

A known design powers a linear actuator along a guide slot provided in a housing of the clamp. The end of the linear actuator is pivotally connected to a linkage member which in turn is pivotally connected to a lever arm of a pivot pin. The linear actuator provides reciprocal linear movement along the guide slot, thus driving the linkage member and converting the linear movement into rotational movement of the pivot pin. A clamp arm is connected to the pivot pin for rotary motion of the clamp arm between a clamped position and an unclamped position.

Typically, such designs try to prevent the over travel of the linkage member to an over-center position wherein the pivot points of the linkage member are at a zero degree angle with respect to one another, in other words, the longitudinal axis of the linkage member is at a position perpendicular to the longitudinal axis of the guide slot. As the linkage angle approaches zero degrees, the linkage force approaches infinity through the relationship $P=F \div \tan\alpha$ where P=the linkage force, F=the linear actuator force and $\alpha$=the linkage angle. Thus, as the linkage member approaches the over-center position, the clamp mechanism experiences ultra-high linkage forces which may cause premature wearing of the linkage mechanism or may cause the linkage mechanism to "freeze" or "lock up". For example, when a clamp arm is adjusted to provide maximum clamping pressure on a work piece at standard factory air pressure, such as 80 p.s.i., any travel to center or slight over-center of the linkage member has been found in most commercial clamps currently available to require a release pressure exceeding the 80 p.s.i. supply line pressure by as much as 20–30 p.s.i. Since this may result in a "lock up" clamp which cannot be released by standard air pressure, such clamps are normally operated with a limited travel of the linear actuator or lever arm to a linkage angle short of 0°, i.e. in the order of 8°–4°, to assure that supply line pressure will always release the clamp.

Other designs provide for the linkage mechanism to travel to a positive center or slight over-center locking position wherein needle bearings are utilized so that the cylinder pressure required to release the clamp is no greater than the cylinder pressure needed to actuate the clamp to the locking position. Such configurations are capable of producing high clamping forces, but they are also subject to undesirable wear to the internal mechanism created during the passage through the ultra high force over-center position. The result of the wear is the reduction of the clamp forces in which the clamp can produce.

When trying to control the travel of the linkage mechanism, most clamp designs do not consider controlling the clamping force. Applicant's U.S. Pat. No. 4,905,973 prevents the linkage mechanism from reaching the over-center position by having a positive stop on the lever arm engage an internal surface in the housing of the rotary clamp. Others provide a stop to a portion of the linear actuator, and thus, the over-center position may never be reached although wear may create play within the linkage mechanism thereby effecting the clamping force of the clamp arm. Others provide a stop for the clamp arm while allowing the linkage mechanism to near and approach the over-center position.

Although preventing the linkage member from reaching the over-center position may ensure that the supply line pressure will release the clamp, most clamps do, not provide a means by which to manually release the clamp without disassembling the clamp should the power and/or control means fail to operate the clamp when in the clamped position. This is especially so when the internal mechanisms of the rotary clamp are fully disposed within an enclosed housing.

Some clamp designs prevent the linkage member from reaching an over-center position by utilizing a positive stop on the lever arm to engage the housing and limit the clamping position and force of the clamp arm. Since the lever arm is coupled to the linkage assembly, the linkage member is prevented from reaching the over-center position. Due to the number of reciprocating cycles realized by the linkage mechanism during the life of the clamp and due to the large and variable forces that are realized by the linkage mechanism during those cycles, the tolerances or "slop" within the linkage mechanism begin to increase thus allowing the linkage member to slowly approach the over-center position. Thus, it would be desirable to provide a secondary stop to ensure that the linkage member cannot reach the over-center position while still maintaining a consistent clamping force and position over the life of the clamp.

The linkage force and actuation force may also be affected by additional friction and binding created by the linkage mechanism and linear actuator. Often the linear actuator is subject to forces having components that are perpendicular to the line of linear motion. Often side walls are machined within the guide slot of the housing to support the linear actuator against these forces. Such guide slots are difficult and expensive to manufacture thus creating an undesirable situation in industry.

SUMMARY OF THE INVENTION

The present invention overcomes the above-noted short comings by providing a rotary clamp for a linear actuator that provides means for converting linear actuator motion between a first position and a second position into rotary clamped motion between an unclamped position and a clamped position, respectfully, wherein a reciprocal member provides means for manually resetting the converting means toward the first position without having to disassemble the rotary clamp and provides stop means for limiting the travel of the linear actuator in the second position. The resetting means of the present invention provides a means for manually moving the converting linkage toward the unclamped position should the clamp become inoperative in the clamped position. The secondary stop means of the present invention provides a secondary stop for the converting means to prevent the linkage member from reaching the over-center position.

The present invention of the rotary clamp for a linear actuator includes an enclosed housing connected to the linear actuator. The linear actuator has a cylinder connected to the end of the housing, a piston supported within the cylinder for reciprocation therein and a piston rod connected to the piston and projecting from the cylinder into the housing. The housing provides an elongated guide slot means having a longitudinal axis for receiving the piston rod. A rod end is connected to the piston rod for reciprocal movement and is received and slidably guided by the guide slot means in the housing.

A pivot pin is rotatably supported within the housing, and the pivot pin has at least one end externally accessible with respect to the housing. A lever arm integral with and extending from the pivot pin is disposed within the housing. A pivotal linking means pivotally connects the lever arm and the rod end to transform the linear reciprocal movement of the rod end into angular rotary movement of the pivot pin. A cam means for guiding and supporting the rod end extends integral with and outward from the pivot pin. The cam means provides a pair of guide lobes that engage and support the rod end against components of the linkage force that direct the rod end toward the pivot pin. A clamping means is connected to at least one of the ends of the pivot pin that is externally accessible with respect to the housing. The angular rotary motion of the pivot pin is transferred to move the clamping means between a clamped position and an unclamped position.

A primary stop integral with and extending from the pivot pin engages an internal surface of the housing in order to accurately orientate the clamping position of the clamping means. The linear actuator drives the linking means towards the over-center position until the primary stop engages the internal surface of the housing and all excess tolerances within the linkage mechanism are absorbed.

To prevent the linking means from reaching the over-center position, wherein a longitudinal axis of the linking means becomes perpendicular with the longitudinal axis of the guide slot means provided in the housing and wherein the linkage force of the linking means approaches infinity as the linking means approaches the over-center position or 0° linkage angle, a reciprocal member acts as a secondary stop to prohibit the linking means from reaching the over-center position.

The reciprocal member is slidably disposed in a wall of the housing and is aligned with the rod end so that the rod end engages and displaces the reciprocal member in the second position. Should power or control of the system fail such that the linear actuator cannot release the clamping means when the clamping means is in the clamped position, an operator may manually reset the rotary clamp by striking the reciprocal member so that the reciprocal member engages the rod end with sufficient force to move the rod end toward the first position without having to disassemble the rotary clamp. This increases the linkage angle and reduces the release force required to withdraw the piston and move the clamping means toward the unclamped position.

Thus, the objects of the invention are to provide a new and improved rotary clamp for a linear actuator that provides a means for converting linear actuator motion between a first position and a second position into a rotary clamp motion between a clamped position and an unclamped position wherein a reciprocal member provides for manually resetting the linear actuator toward the first position without having to disassemble the rotary clamp or linear actuator; to provide a new and improved rotary clamp for a linear actuator that provides a reciprocal member for providing a secondary stop for limiting the travel of the linear actuator in the second position; and to provide a new and improved rotary clamp for a linear actuator that provides a cam means for supporting and guiding the rod end against linkage forces perpendicular to the linear line of motion.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
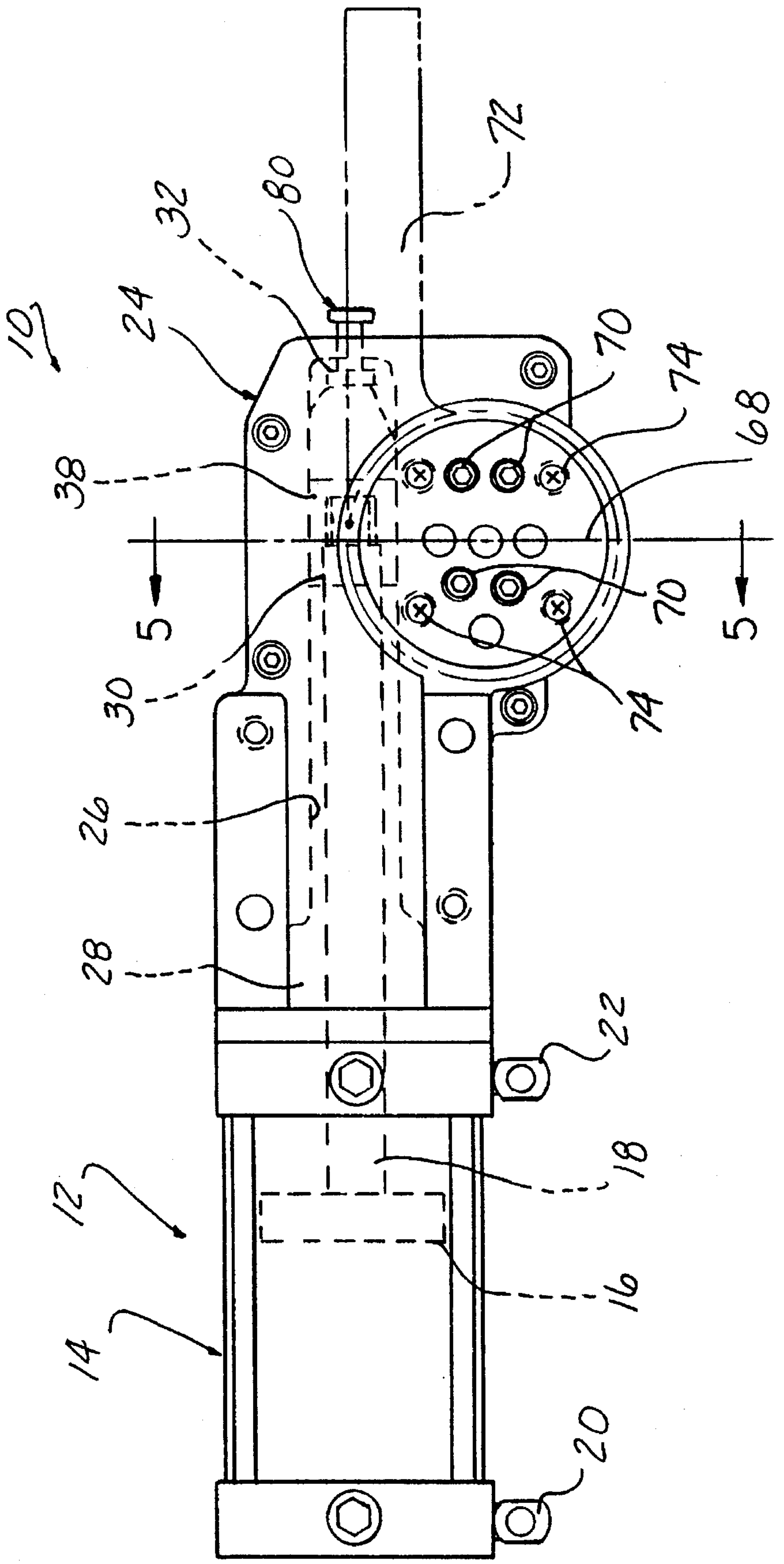
FIG. 1 is a side view showing the rotary clamp and linear actuator in the clamped position and the second position, respectfully.

FIG. 1 shows the rotary clamp 10 for a linear actuator 12 according to the present invention. The linear actuator 12 provides a fluid cylinder 14 and a reciprocal piston 16 slidably disposed therein. A piston rod 18 is attached to the piston 16 and extends outward from the fluid cylinder 14. The cylinder 14 has respective opposite rear and front fluid inlets 20, 22 which, as is known in the art, are suitably connected by conduits (not shown) to a source of fluid (not shown) under pressure. The cylinder 14 may be hydraulic, pneumatic, or conversely, a mechanical reciprocating device which may be used to actuate the linear actuator 12 by reciprocation of the piston rod 18.

Figure 2:
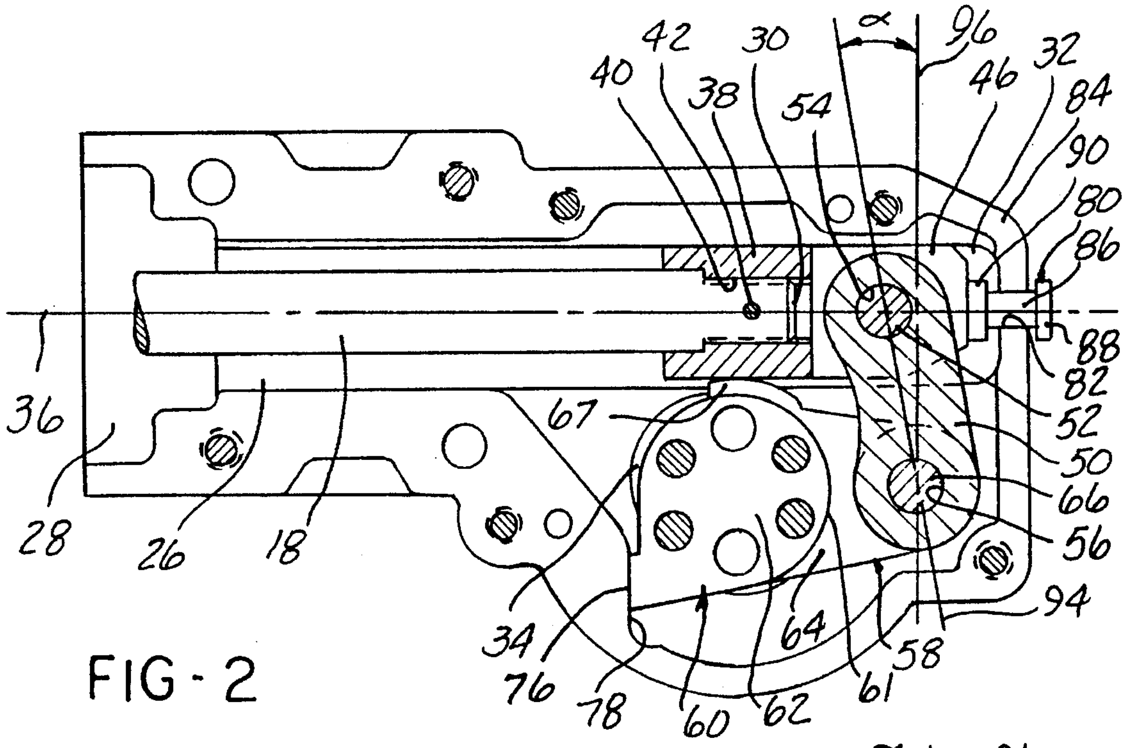
FIG. 2 is a sectional view showing the internal mechanism of the rotary clamp and showing the reciprocal member being engaged and displaced by the rod end of the linear actuator.
Figure 5:
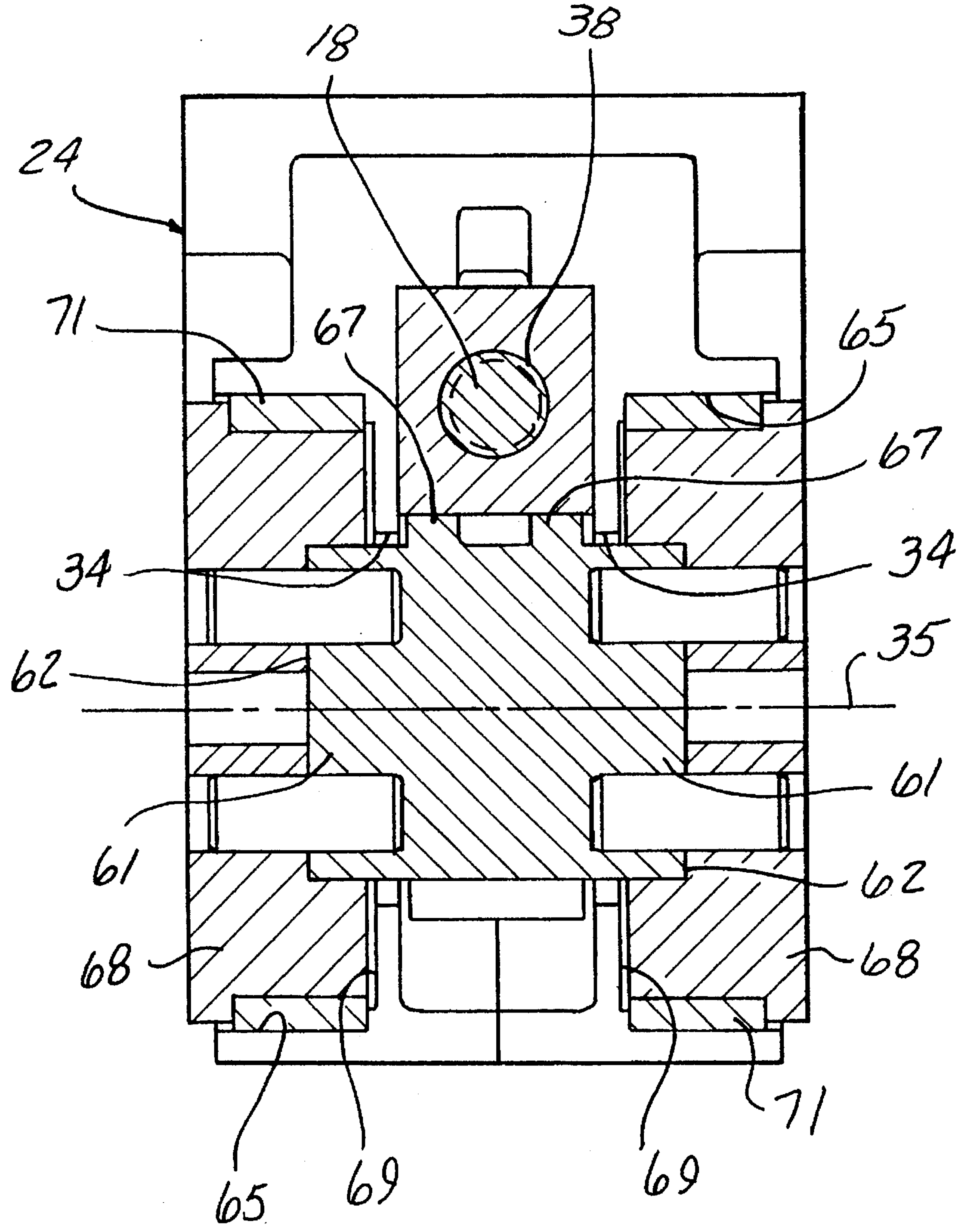
FIG. 5 is a section view taken in the direction of arrows 5—5 in FIG. 1 showing the guide lobes supporting the rod end of the linear actuator.

Attached to one end of the cylinder 14 is a hollow housing 24 which houses means for converting the linear actuator motion into an angular rotary clamp motion. As seen in FIGS. 1 and 2, the housing 24 has an elongated internal guide slot 26 with one end 28 open adjacent the cylinder 14 to receive the free end 30 of the piston rod 18 within the guide slot 26. The other end 32 of the guide slot 26 is closed by the internal surfaces of the housing 24. As seen in FIGS. 2 and 5, the housing 24 also includes a pair of coaxial apertures 34 having a common transverse axis 35 offset from and substantially perpendicular to a longitudinal axis 36 of the guide slot 26.

Figure 3:
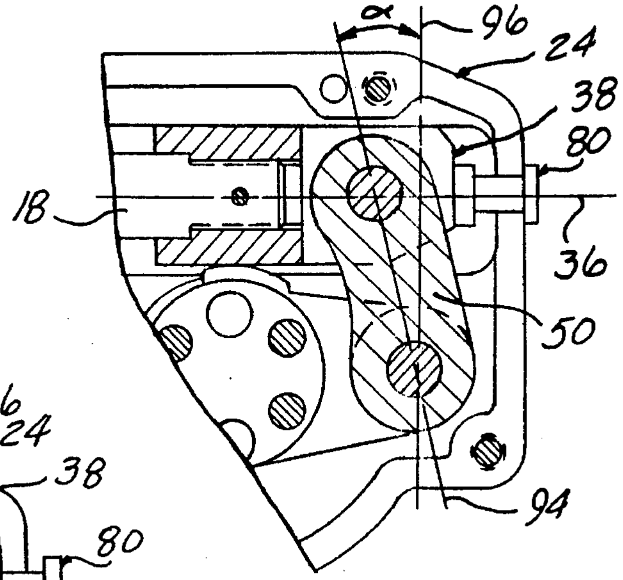
FIG. 3 is a sectional view with some parts broken away showing the reciprocal member engaging the rod end of the linear actuator and having reset the converting linkage by moving the rod end toward the first position.
Figure 4:
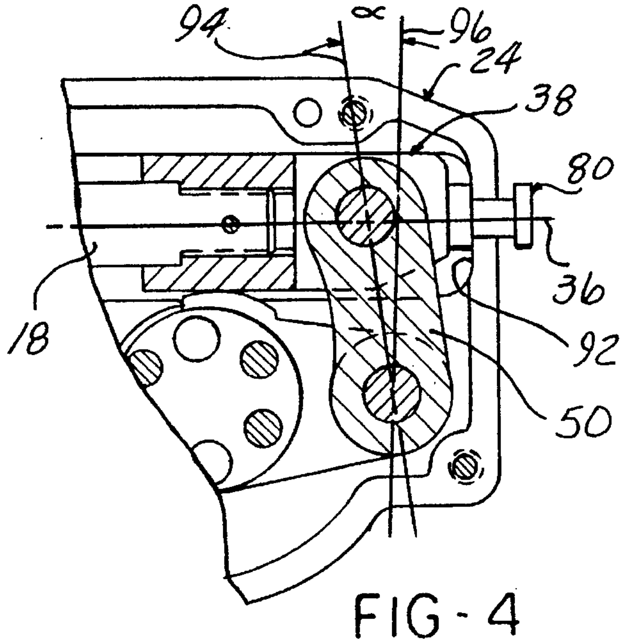
FIG. 4 is a sectional view with some parts broken away showing the reciprocal member providing a secondary stop for limiting the travel of the linear actuator and prohibiting the linkage member from reaching the over-center position.

In order to couple the linear actuator 12 with the converting means, a rod end 38 is connected to the free end 30 of the piston rod 18 for reciprocal movement between a first position, wherein the piston rod 18 and rod end 38 are fully withdrawn toward the open end 28 of the guide slot 26, and a second position, wherein the piston rod 18 and rod end 38 are extended toward the closed end 32 of the guide slot 26 as seen in FIGS. 2–4. As seen in FIG. 2, the rod end 38 is slidingly guided within the guide slot 26 of the housing 24. The rod end 38 generally has a rectangular cross section with beveled edges and a threaded aperture 40 disposed within one end of the rod end 38 to threadingly engage the free end 30 of the piston rod 18. A lock pin 42 is provided through an aperture in the rod end 38 extending into the threaded aperture 40 for engaging the piston rod 18 to prevent disengagement of the piston rod 18 from the rod end 38. The opposite end of the rod end 38 includes a slot (not shown) defined by two opposed protruding portions 46 (only one shown) of the rod end 38. A pair of coaxial apertures (not shown), having a common axis, are formed in the two opposed protruding portions 46 of the rod end 38.

To transform the linear actuator motion to rotary clamp motion, a pivotal linking means pivotally connects the linear actuator 12 to a lever arm 58. The pivotal linking means provides a linkage member 50 slidably disposed within the slot of the rod end 38 and extending outwardly therefrom. The linkage member 50 is pivotally connected to the rod end 38 through a pin 52. The pin 52 passes through an aperture 54 provided in the linkage member 50 and through the pair of coaxial apertures extending through the rod end 38. An aperture 56 is also provided at the opposite end of the linkage member 50 for pivotally connecting the lever arm 58 of a pivot pin 60.

Angular rotary motion is imparted to the pivot pin 60, which is rotatably disposed within the pair of coaxial apertures 34 in the housing 24, for angular movement about the trainsverse axis 35. The pivot pin 60 has a cylindrical body portion 61 having opposite ends 62 extending through the coaxial apertures 34 provided in the housing 24. The lever arm 58 is integral with and extends outwardly from the pivot pin body portion 61 while remaining within the internal portions of the housing 24. The lever arm 58 is formed by two opposed substantially parallel members 64 (only one shown) extending from the pivot pin body portion 61. A pair of coaxial apertures (not shown), having a common axis, are formed in the two oppoised members of the lever arm 58. The end of the linkage member 50 is slidably received between the two opposed members 64 of the lever arm 58, and a pin 66 is inserted through the apertures in the lever arm 58 and through the aperture 56 in the linkage member 50.

To reduce the amount of actuation force required to move the rod end 38, the lever arm 58 provides a pair of substantially parallel guide lobes or cams 67 wherein the guide lobes 67 extend radially outward from and are integral with said pivot pin body portion 61, as seen in FIGS. 2–5. The guide lobes 67 engage a bottom surface of the rod end 38 as the rod end 38 passes by the pivot pin body 61 when moving along the guide slot 26. The guide lobes 67 support and counteract forces on the rod end 38 having components created by the linkage member 50 that are substantially perpendicular to the longitudinal axis 36 of the guide slot 26 and directed toward the pivot pin 60. The guide lobes 67 eliminate the need to machine a groove or sidewall within the internal walls of the housing to support the rod end 38 from such forces created by the linkage mechanism. The combination of the rod end 38, the linkage member 50 and the pivot pin 60 with the lever arm 58 provide means for converting linear reciprocal actuator motion into angular rotary clamp motion.

To secure the pivot pin 60 within the housing 24, pivot pin end portions 68 are connected to the opposite ends 62 of the pivot pin body portion 61, as seen in FIGS. 1 and 5. A pair of substantially cylindrical recesses 65 are provided externally in the housing 24. The recesses 65 are coaxially aligned with the apertures 34 provided in the housing 24 with which the ends 62 of the pivot pin body portion 61 extend therethrough. The portions of the housing 24 that define the apertures 34 in thie housing 24 provide a bottom or floor 69 to the recesses 65 by which to substantially close the enclosure of the housing 24. The pivot pin end portions 68 are received and seated within the recesses 65 of the housing 24 and are connected to the ends 62 of the pivot pin body portion 61 by conventional fasteners 70. To accommodate the rotary movement of the pivot pin end portions 68 within the recesses 65, a cylindrical bearing 71 may be utilized within the inside diameter of the recess 65. A clamp arm 72 may then be attached to the pivot pin end portion 68 by conventional fasteners 74 for movement between a clamped position, wherein the clamp arm 72 holds a work piece (not shown) against a clamping surface (not shown), and an unclamped position, wherein the clamp arm 72 releases a work piece from a clamping surface.

To ensure the clamping position of the clamp arm 72, a primary stop 76, integral with and extending from the pivot pin body portion 61, as seen in FIG. 2, engages an internal wall 78 of the housing 24 when the clamp arm 72 is in the clamped position and the linear actuator 12 is in the second position. By limiting the pivotal rotation of the pivot pin 60 through the primary stop 76 engaging the internal wall 78 of the housing 24 in the clamped position, the clamping position of the clamp arm 72 remains consistent. By stopping the pivot pin 60 and not the linear actuator 12, the criticality of tolerance build up in the internal linkage between the pj. ston rod 18 and the pivot pin 60 is eliminated as the linear actuator 12 will expand its travel to eliminate "slop" within the linkage mechanism. An 8° linkage angle α should be maintained such that by selecting materials and finishes for the internal mechanism or action of the clamp 10, a balance can be set up between the linkage angle α and the frictional forces of the rod end 38 so that when the clamp 10 is actuated, the clamp arm 72 remains locked even in the case of loss of air pressure in the cylinder 14, so that the clamp 10 remains safe and will not open unexpectedly.

Even though the clamp 10 is designed not to open unexpectedly upon the loss of power or air pressure in the cylinder 14, it may be desirable to move the clamp 10 to the unclamped position in order to release a work piece or reset the linkage mechanism. Even at an 8° linkage angle α, the linkage force may still be too great to manually move the rotary clamp 10 to the unclamped position without disassembling the rotary clamp 10 or the linear actuator 12. Thus, a reciprocal member 80 is slidably disposed within an aperture 82 provided within a wall 84 of the housing 24, as seen in FIGS. 1–4. The reciprocal member 80 has a cylindrical body 86 with a pair of larger cylindrical end portions 88, 90 integral with the body 86 of the reciprocal member 80. The aperture 82 provided in the wall 84 of the housing 24 is slightly larger than the diameter of the main body 86 of the reciprocal member180 and is smaller than the diameter of the end portions 88, 90 of the reciprocal member 80. This allows the reciprocal member 80 to slidably move through the aperture 82 while being positively captured by the end portions 88, 90 of the reciprocal member 80 by abutting the walls 84 of the housing 24. The reciprocal member 80 moves along the same longitudinal axis 36 as the guide slot 26 and rod end 38 such that the rod end 38 engages and displaces the reciprocal member 80 upon the rod end 38 reaching the second position. When the clamp 10 is in the clamped position and a loss of power and/or air pressure occurs Within the cylinder 14, the reciprocal member 80 may manually reset the rotary clamp 10 by striking the reciprocal member from the outside of the housing 24 and forcing the rod end 38 toward the first position and driving the linkage member 50 away from the clamped position, as seen in FIG. 3. This increases the linkage angle e to a level which either allows the clamp 10 to become reset or allows the clamp 10 to be manually manipulated.

In order to prohibit the linkage member 50 from reaching the over-center position, wherein the longitudinal axis 94 of the linkage member 50 is prevented from reaching a position 96 perpendicular to the longitudinal axis 36 of the elongated guide slot 26, the reciprocal member 80 acts as a secondary stop to the linkage member 50 when the reciprocating member 80 is fully displaced against an internal wall 92 of the housing 24, as seen in FIG. 4. When the reciprocating member 80 is in this retracted position, the rod end 38 abuts the reciprocating member 80 thereby stopping the linkage member 50 from reaching the over-center position. Preferably, the linkage angle $\alpha$ is prevented from dropping below 4°. The 4° linkage angle $\alpha$ provides a safe margin in which the linkage member 50 will not realize the ultra high forces that are realized when approaching the over-center position.

It should be noted that the present invention is not limited to a reciprocal member 80 having a cylindrical body 86 and ends 88, 90, but rather, the reciprocal member 80 may utilize any geometry which allows the reciprocal member 80 to be slidably disposed within the wall 84 of the housing 24 while engaging the linkage mechanism internally and providing access to the reciprocal member 80 externally.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary clamp for a linear actuator comprising:

means for converting linear actuator motion between a first position and a second position into rotary clamp motion between an unclamped position and a clamped position, respectively; and means, separate from said linear actuator and cooperatively engageable with said converting means for movement between a recessed position and an extended position, for resetting said converting means toward said first position when said resetting means is in said extended position.

2. A rotary clamp for a linear actuator comprising:

means for converting linear actuator motion between a first position and a second position into rotary clamp motion between an unclamped position and a clamped position, respectively;

means, separate from said linear actuator, for resetting said converting means toward said first position; and stop means for limiting the travel of said linear actuator in said second position.

3. A rotary clamp for a linear actuator comprising:

means for converting linear actuator motion between a first position and a second position into rotary clamp motion between an unclamped position and a clamped position, respectively; and means, separate from said linear actuator, for resetting and converting means toward said first position and limiting the travel of said linear actuator in said second position.

4. A rotary clamp for a linear actuator comprising:

a housing having an elongated slot means for receiving and guiding said linear actuator;

a pivot pin rotatably supported by said housing;

means for pivotally linking said pivot pin to said linear actuator for transforming reciprocal movement of said linear actuator into rotary motion of said pivot pin;

means for clamping a workpiece, and said clamping means connected to said pivot pin and moving between said clamped position and said unclamped position when said linear actuator moves between said first position and said second position, respectively; and means, separate from said linear actuator, for resetting said converting means toward said first position.

5. The rotary clamp stated in claim 4, wherein said converting means further comprises:

cam means for supporting and guiding movement of said linear actuator along said elongated slot means.

6. The rotary clamp stated in claim 5 wherein said supporting and guiding cam means further comprises:

a guide lobe integral with and extending radially from said pivot pin for engaging and supporting said rod end against linkage forces directing said rod end toward said pivot pin.

7. A rotary clamp for a linear actuator comprising:

a housing having an elongated slot means for receiving and guiding said linear actuator wherein said linear actuator moves between a first position and a second position;

a pivot pin rotatably supported by said housing;

a lever arm integral with and extending from said pivot pin;

means for pivotally linking said lever arm to said linear actuator for transforming reciprocal movement of said linear actuator into rotary motion of said pivot pin;

means for clamping a workpiece, and said clamping means connected to said pivot pin and moving between a clamped position and an unclamped position when said linear actuator moves between said first position and said second position, respectively;

a primary stop integral with and extending from said pivot pin and engaging said housing in said clamped position; and means, separate from said linear actuator, for resetting said converting means toward said first position.

8. The rotary clamp stated in claim 7 wherein said resetting means comprises:

a reciprocal member slidably disposed in a wall of said housing wherein said reciprocal member may engage and move said linear actuator toward said first position.

9. The rotary clamp stated in claim 7 further comprising:

secondary stop means for limiting the travel of said linear actuator in said second position.

10. The rotary clamp stated in claim 9, wherein said secondary stop means comprises:

a reciprocal member slidably disposed in a wall of said housing, and said linear actuator abutting said reciprocal member against said wall inside of said housing to limit the travel of said linear actuator in said second position.

11. The rotary clamp stated in claim 7, wherein said means for resetting further comprises:

secondary stop means for limiting the travel of said linear actuator in said second position.

12. The rotary clamp stated in claim 11, wherein said resetting means further comprises:

a reciprocal member slidably disposed in a wall of said housing and moving between a retracted position, wherein said reciprocal member abuts said wall inside of said housing, and an extended position, wherein said reciprocal member may engage and move said linear actuator toward said first position to reset said converting means, and said reciprocal member providing a secondary stop when in said retracted position to limit the travel of said linear actuator when in said second position.

13. The rotary clamp stated in claim 7, wherein said converting means further comprises:

cam means for supporting and guiding movement of said linear actuator along said elongated slot means.

14. The rotary clamp stated in claim 13 wherein said supporting and guiding cam means further comprises:

a pair of spaced guide lobes integral with and extending radially from said pivot pin for engaging and supporting said rod end against linkage forces directing said rod end toward said pivot pin.

15. A rotary clamp for a linear actuator comprising:

an enclosed housing coupled to said linear actuator wherein said linear actuator has a cylinder connected to said housing and a reciprocal piston connected to a piston rod projecting from said cylinder, and said housing having an elongated guide slot having a longitudinal axis for receiving said piston rod;

a rod end connected to said piston rod for reciprocal movement, said rod end slidably guided and received by said guide slot in said housing;

a pivot pin having a cylindrical body portion and a cylindrical end portion larger than said pivot pin body portion, and said body portion rotatably supported by said housing having at least one end extending externally from said housing;

a lever arm integral with and extending from said pivot pin body portion and disposed in said housing;

a linkage member having one end pivotally connected to said lever arm and another end connected to said rod end for transforming reciprocal linear movement of said rod end into angular rotary movement of said pivot pin;

a pivot pin end portion seated in a recess in said housing and connected to said end of said pivot pin body portion;

a clamp arm connected to said pivot pin end portion external to said housing for movement between a clamped position and an unclamped position;

a primary stop integral with and extending from said pivot pin body portion, and said primary stop engagable with an internal surface of said housing when said clamp arm is in said clamping position to ensure the position of said clamp arm when in said clamping position;

a reciprocal member having a body portion and two end portions integral with and larger than said body portion, and said reciprocal member slidably disposed in a wall of said housing wherein one of said two end portions remains external to said housing and the other of the two end portions remain internal to said housing;

said reciprocal member manually resetting said rod end by engaging and moving said rod end toward said first position;

a pair of substantially parallel guide lobes integral with and extending radially outward from said pivot pin body portion for engaging and supporting said rod end along said guide slot; and said reciprocal member providing a secondary stop when said rod end engages and displaces said reciprocal member against said wall of said housing for limiting the travel of said rod end in said second position to prevent said linkage member from traveling to said over-center position.

16. A rotary clamp for a linear actuator comprising:

a housing having an elongated slot means for receiving and guiding said linear actuator;

a pivot pin rotatably supported by said housing;

means for pivotally linking said pivot pin to said linear actuator for transforming reciprocal movement of said linear actuator between said first position and a second position into rotary motion of said pivot pin between an unclamped position and a clamped position, respectively; and cam means for guiding and supporting said linear actuator, and said cam means having a pair of substantially parallel guide lobes extending radially outward from said pivot pin for engaging and supporting said linear actuator from linkage forces directing said linear actuator toward said pivot pin.

* * * * *